United States Patent Office 2,995,583
Patented Aug. 8, 1961

2,995,583
METHOD FOR PREPARATION OF GLYCIDYL ETHER OF POLYHYDRIC PHENOLS
Barrymore T. Larkin, Slickville, and William E. St. Clair, Pittsburgh, Pa., assignors to Koppers Company, Inc., a corporation of Delaware
No Drawing. Filed Jan. 13, 1958, Ser. No. 708,409
3 Claims. (Cl. 260—348.6)

This invention relates to a process for the manufacture of glycidyl ether of polyhydric phenols.

Substantially all of the hydroxy groups of a polyhydric phenol can be replaced by glycidyloxyl groups through the reaction of a polyhydric phenol with sodium hydroxide and an excess of epichlorohydrin; the reaction being generally:

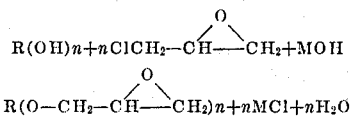

wherein $n$ denotes the number of phenolic hydroxyl groups contained in a molecule of the polyhydric phenol and is at least 2. R is the organic radical to which the phenolic hydroxyl groups are linked in the phenol. M is an alkali metal.

The presence of water tends to interfere with the etherification process, as efforts have been made heretofore to remove substantially all of the water from the reaction. To this end it has been usual to remove the water as a vapor while a concentrated aqueous solution of the alkali hydroxide is slowly added to the reaction vessel which contains the heated solution of polyhydric phenol in excess epichlorohydrin. These vapors contain both water and epichlorohydrin owing to the azeotropic behavior of the mixture and are sent to a condenser. The condensate from the condenser is fed to a chamber where the condensate separates into an aqueous layer and epichlorohydrin layer. The aqueous layer is discharged and epichlorohydrin layer returned to the reaction vessel.

While high purity glycidyl ether of polyhydric phenol can be prepared by the above process, difficulties have been experienced in separating the product from the sodium chloride which is also formed. This sodium chloride, being insoluble in the epichlorohydrin, precipitates in a gelatinous form; and when the slurry is filtered to separate the glycidyl ether from the salt, the salt clogs the filter openings so that extreme difficulty is experienced in obtaining the filtrate.

According to the invention, high yields of high quality glycidyl ether of polyhydric phenol can be obtained and the glycidyl ether product readily separated from the salt product by maintaining the reaction of polyhydric phenol, epichlorohydrin, and alkali metal hydroxide under total reflux during the period of addition of one half of the alkali metal hydroxide solution (as a concentrated aqueous solution) and removing the water from the reaction mass during the period that the other half of the aqueous metal hydroxide solution is added to the reaction mass. The small amount of water in the reaction mass enables the sodium chloride to form as crystals of such size as to permit ready filtration of the product.

The process can be carried out in an agitated vessel having a valved entrance for feeding the aqueous hydroxide solution to the vessel, a heater for the vessel, a vapor outlet for the vessel, a condenser for the vapors, a separating chamber for receiving the condensate from the condenser equipped with a discharge for the upper water layer, and a return for the lower epichlorohydrin layer to the reaction vessel, and means for measuring the temperatures of the vapor and the reaction mass.

Any suitable polyhydric phenols can be used in this process for the production of its glycidyl ether. Typical phenols include resorcinol, hydroquinone, methyl resorcinol, phloroglucinol, 1,5-dihydroxynaphthalene, 4,4'-dihydroxydiphenyl, bis (4-hydroxyphenyl)methane, 1,1-bis (4-hydroxyphenyl) ethane, 1,1-bis (4-hydroxyphenyl) isobutane, 2,2-bis(4-hydroxyphenyl) propane which is termed bis-phenol hereinafter for convenience, 2,2-bis(4-hydroxyphenyl) butane, 2,2-bis(4-hydroxy-2-methylphenyl)propane, 2,2-bis(2-hydroxy-4-tertiary-butylphenyl) propane, 2,2-bis(2-hydroxyphenyl)propane, 2,4'-dihydroxydiphenyldimethylmethane, 2,2-bis(2-chloro-4-hydroxyphenyl) propane, 2,2-bis (2-hydroxynaphthyl)-pentane, 2,2-bis(2,5-dibromo-4-hydroxyphenyl) butane, 4,4-dihydroxybenzophenone, 1,3-bis(4-hydroxyphenyloxy)-2-hydroxypropane, 3-hydroxyphenyl salicylate, 4-salicoylamino-phenol, as well as more complex polyhydric phenols such as novalac resins obtainable by acid catalyzed condensation of phenol, p-cresol, or other substituted phenols with aldehydes such as formaldehyde, acetaldehyde, crotonaldehyde. The polyhydric phenols contain 2 or more phenolic hydroxyl groups in the average molecule thereof and are free of other functional groups which would interfere with formation of the desired glycidyl ethers.

The epichlorohydrin being 2.5–3 moles in excess per phenol hydroxyl group to be replaced acts as a solvent for the polyhydric phenol and the resulting glycidyl ether.

The alkali metal hydroxide, such as sodium or potassium hydroxide, is added to the reaction mixture as an aqueous solution of at least 15% by weight of the hydroxide. It has been found advantageous, however, to use as high a concentration of aqueous hydroxide solution as is possible. It has been found convenient to use a solution containing 74% sodium hydroxide, for example, and to have the solution heated to prevent its solidification. This has the advantage of maintaining at a minimum the quantity of water added to the reaction mixture with the alkali metal hydroxide. A total amount of about 1 mol equivalent of alkali metal hydroxide per mol of phenol hydroxide equivalent of the polyhydric phenol.

After the addition of all of the aqueous alkali metal hydroxide solution the return of the epichlorohydrin layer is stopped and the separation and discharge of the water is continued until the water ceases to come off and the reaction becomes substantially anhydrous. The reaction mass is cooled and filtered, the filtrate is then distilled to remove unreacted epichlorohydrin.

The following examples are given for the purpose of illustrating the invention.

*Example I*

To a reaction vessel equipped with a heater, a thermometer, a mechanical stirrer, a dropping device, a condenser equipped with a condensate collection and separation chamber having a return for recycling the lower epichlorohydrin layer to the reaction vessel and a discharge for the upper water layer was charged 244 grams of epichlorohydrin and 48 grams of resorcinol. This mixture was heated to 107° C. and 35.2 grams of sodium hydroxide was added as a 74% solution, through the dropping device. This addition of caustic required about 40 minutes during which the water was discharged and the epichlorohydrin returned to the reaction mass. Thereafter the reaction mass was heated for an additional 50 minutes at the end of which time no more water was removed from the reaction mass. The mass was cooled and attempts to filter the mass resulted in failure. The product was a viscose slurry which soon clogged the filter pores. A portion of the product was diluted with benzene and a portion filtered. The resulting sodium chloride was screened (standard U.S. screen) to yield the following analysis:

5% on 60 mesh
13% on 80 mesh
19% on 100 mesh
28% on 150 mesh
35% through the 150 mesh

*Example II*

The Example I was repeated using 244 grams of epichlorohydrin, 48 grams of resorcinol, and 25.2 grams of sodium hydroxide as a 74% aqueous solution. The aqueous sodium hydroxide solution was added at the rate of 17 grams per minute per 100 grams of resorcinol. During the addition of one half of this caustic solution, which addition required about 21 minutes, the reacting vessel was kept under total reflux. During the rest of the addition the condenser was connected to the separating vessel and the epichlorohydrin layer recycled. This required an additional 21 minutes. Thereafter the mass was heated for an additional 49 minutes at the end of which time no more water was coming off the reaction mass. The product was filtered and the filtrate readily came through the filter medium. The salt on the filter had the following analysis:

36% on 60 mesh (U.S. standard screen)
10% on 80 mesh (U.S. standard screen)
16% on 100 mesh (U.S. standard screen)
21% on 15 mesh (U.S. standard screen)
7% through the 150 mesh (U.S. standard screen)

The product was distilled to remove the excess epichlorohydrin, the residue was 97.9% resorcinol diglycidyl ether having an oxirane oxygen content of 12.2% and a viscosity of 320 c.p.s. at 25° C.

What is claimed:

1. In a process for the production of a glycidyl ether of a polyhydric phenol by the reaction of a polyhydric phenol, epichlorohydrin, and an alkali metal hydroxide, the improvement which produces solids from which the liquid is readily filterable and which comprises adding a half molar equivalent of concentrated aqueous solution of said alkali metal hydroxide to a heated and agitated solution of said polyhydric phenol dissolved in an excess of said epichlorohydrin while maintaining the solution under total reflux, thereafter adding half a molar equivalent of said concentrated aqueous solution while distilling vapors of water and epichlorohydrin from the reaction mixture and condensing the vapors and discharging the water of the condensate and recycling the epichlorohydrin to the reaction mixture.

2. In a process for producing the glycidyl ether of a polyhydric phenol by the reaction of a polyhydric phenol with epichlorohydrin and an alkali metal hydroxide, the improvement which comprises: heating a solution of said polyhydric phenol dissolved in an excess of epichlorohydrin and adding a half molar equivalent of concentrated aqueous solution of said alkali metal hydroxide while maintaining the solution under total reflux and thereafter adding half a molar equivalent of said concentrated aqueous solution while distilling vapors of water and epichlorohydrin from the reaction mixture, and removing the water from the vapors and recycling the epichlorohydrin back to the reaction mixture.

3. The process of claim 2 wherein the alkali metal hydroxide is sodium hydroxide.

References Cited in the file of this patent

UNITED STATES PATENTS

| | | |
|---|---|---|
| 1,446,872 | Brooks | Feb. 27, 1923 |
| 2,467,171 | Werner et al. | Apr. 12, 1949 |
| 2,564,194 | de Nie et al. | Aug. 14, 1951 |
| 2,640,037 | Parry | May 26, 1953 |
| 2,735,829 | Wiles | Feb. 21, 1956 |
| 2,758,119 | Bell | Aug. 7, 1956 |
| 2,841,595 | Pezzaglia | July 1, 1958 |
| 2,892,849 | St. Clair | June 30, 1959 |
| 2,898,349 | Zuppinger et al. | Aug. 4, 1959 |

FOREIGN PATENTS

| | | |
|---|---|---|
| 496,709 | Great Britain | Dec. 5, 1938 |
| 788,350 | Great Britain | Dec. 23, 1957 |